United States Patent [19]

Park

[11] Patent Number: 5,056,475
[45] Date of Patent: Oct. 15, 1991

[54] MOTION CONVERSION MECHANISM FOR CONVERTING BETWEEN ROTATING AND RECIPROCATING MOTION AND AN INTERNAL COMBUSTION ENGINE USING THE SAME MECHANISM

[76] Inventor: Young K. Park, Soungsan Siyoung Apt., 17-1305, 450, Soungsan 2-dong, Mapo-ku, Seoul 121-252, Rep. of Korea

[21] Appl. No.: 438,403
[22] PCT Filed: Apr. 22, 1989
[86] PCT No.: PCT/KR89/00009
§ 371 Date: Dec. 20, 1989
§ 102(e) Date: Dec. 20, 1989
[87] PCT Pub. No.: WO89/10502
PCT Pub. Date: Nov. 2, 1989

[30] Foreign Application Priority Data

Apr. 22, 1988 [KR] Rep. of Korea ............... 88-4603[U]

[51] Int. Cl.[5] ............................................. F02B 75/22
[52] U.S. Cl. ............................... 123/55 R; 123/58 R; 123/59 R; 123/197 AC
[58] Field of Search ............... 123/58 R, 59 R, 197 R, 123/197 AC, 55 R, 311

[56] References Cited

U.S. PATENT DOCUMENTS

| | | | |
|---|---|---|---|
| 1,123,172 | 12/1914 | Compton | 123/197 AC |
| 4,485,769 | 12/1984 | Carson | 123/197 AC |
| 4,608,951 | 9/1986 | White | 123/197 AC |
| 4,932,373 | 6/1990 | Carson | 123/197 AC |

FOREIGN PATENT DOCUMENTS

| | | |
|---|---|---|
| 374054 | 1/1921 | Fed. Rep. of Germany . |
| 3607422 | 9/1987 | Fed. Rep. of Germany ...... 123/197 AC |
| 612889 | 11/1926 | France . |
| 1024666 | 4/1953 | France . |
| 2093119 | 1/1972 | France . |
| WO87/01167 | 2/1987 | PCT Int'l Appl. . |

*Primary Examiner*—David A. Okonsky

[57] ABSTRACT

A motion conversion mechanism for use between a rotating motion and a reciprocating motion, and an internal combustion engine adopting the said motion conversion mechanism are disclosed, in which the motion conversion mechanism is constituted such that a reciprocator having racks along the opposite inner sides thereof is combined with a pinion having teeth along a part of the circumference thereof. When the reciprocator performs reciprocating motions, the teeth of the pinion are meshed with either one of the racks, thereby letting the pinion continuously revolve. The internal combustion engine according to the present invention uses the said motion conversion mechanism in place of the crank and the connecting rod. Further, in this engine, the deceleration and acceleration of the reciprocator in the vicinity of the dead points is adjustable, and therefore, the internal combustion engine according to the present invention can be expected to attain to a state close to the constant pressure cycle which is an ideal state for an internal combustion engine. The internal combustion engine of the present invention will drastically increase the engine efficiency and the engine power.

15 Claims, 13 Drawing Sheets

FIG.11
FIG.12
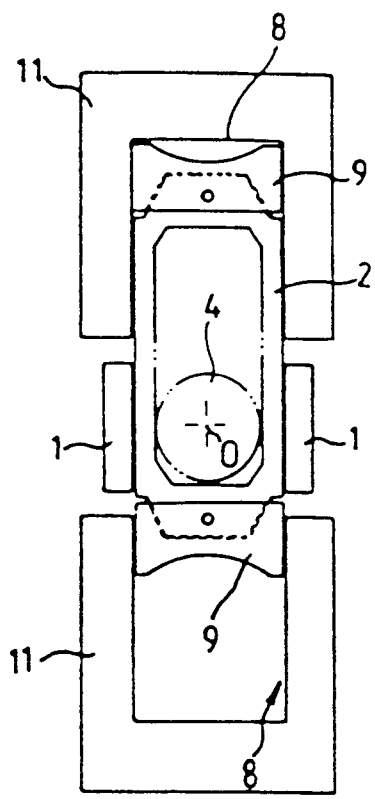
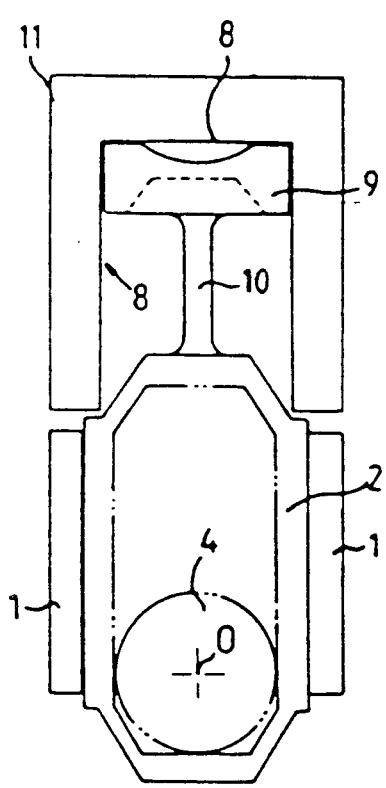
FIG.13
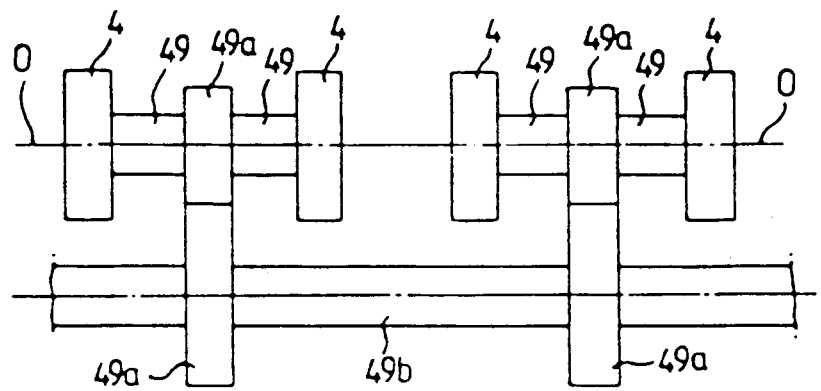

FIG. 19
FIG. 20
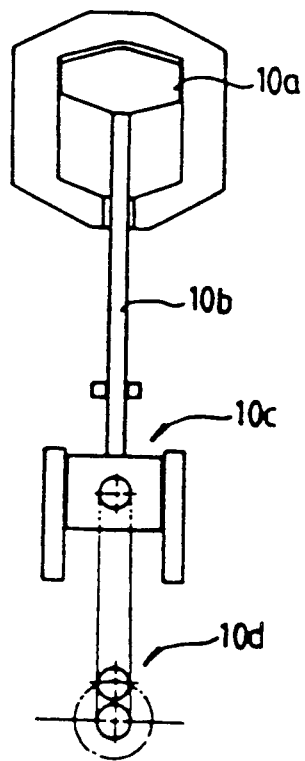
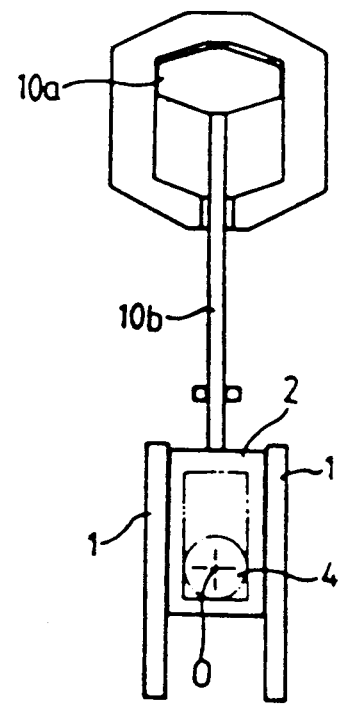

MOTION CONVERSION MECHANISM FOR CONVERTING BETWEEN ROTATING AND RECIPROCATING MOTION AND AN INTERNAL COMBUSTION ENGINE USING THE SAME MECHANISM

FIELD OF THE INVENTION

The present invention relates to a reciprocating internal combustion engine having a special motion conversion mechanism connected between the reciprocating portion and the rotating portion and particularly to a motion conversion mechanism of an internal combustion engine utilizing a rack and pinion mechanism.

BACKGROUND OF THE INVENTION

Motion conversion mechanisms have greatly contributed to mechanical engineering, mechanical industries and other related fields since the Industrial Revolution.

On the other hand, it is also a fact that the designers in those fields have been restricted by the motion characteristics of the conventional motion conversion mechanisms.

In conventional engines, the motion conversion mechanism comprises connecting rods and cranks disposed between pistons and a crankshaft. Such a motion conversion mechanism has the limitations described below.

First, the acceleration of the pistons is very low in the vicinity of the dead points.

Second, the piston velocity or the piston displacement is defined by the angular position of the crank, arbitrary regulation of the motion throughout the whole stroke is impossible.

Third, deviated components of the piston force continuously act on the cylinder wall and toward the center of revolution of the crankshaft, thereby making the movements of the pistons unstable and increasing friction. Because of these limiting features, there are many restrictions in obtaining the optimum motion of the pistons, and accordingly, it is difficult to control the combustion conditions in the working chamber, thereby making it impossible to obtain maximum power and maximum efficiency in an engine.

SUMMARY OF THE INVENTION

An object of the present invention is to provide a motion conversion mechanism in which the deceleration/acceleration rate of the piston can be controlled and all the piston forces are made to act tangentially on the rotation shaft.

Another object of this invention is to provide a reciprocating internal combustion engine in which a rapid increase of gas temperature can be controlled and accordingly the heat loss caused by heat transfer and an increase in the specific heat or heat of dissociation of the gas can be minimized by control of piston speed in the early stage of combustion.

Still another object of this invention is to provide an engine in which a rapid increase of the gas pressure can be controlled so that an increase of compression ratio and super-charging of a gas can be easily obtained approaching the ideal constant pressure engine cycle by controlling the piston speed in the early stage of combustion.

Still another object of this invention is to provide an engine in which the ignition delay before ignition can be easily controlled through control of fuel-air mixture conditions such as fuel-air mixing, gas temperature and pressure, and swirling of gas by controlling the piston speed in the last stage of compression.

Still another object of this invention is to provide an engine in which the ignition delay in the late stage of combustion can be easily controlled through control of the combustion speed during combustion by controlling the piston speed.

Still another object of this invention is to provide an engine in which a wide range of fuel grades can be used because combustion knock can be controlled through control of ignition delay and combustion speed.

Still another object of this invention is to provide an engine which is smaller in bulk and weight than a conventional engine.

Still another object of this invention is to provide a motion conversion mechanism which be used in compressors, pumps, cutting machines, and the like.

BRIEF DESCRIPTION OF THE DRAWINGS

The above objects and other advantages of the present invention will become more apparent from the following description of preferred embodiments with reference to the attached drawings in which:

FIG. 11 is a schematic plan view of an embodiment of a straight reciprocating internal combustion engine according to the present invention in which the reciprocator of the motion conversion mechanism of the present invention is inserted into the cylinder of the engine;

FIG. 12 is a schematic plan view of another embodiment of a straight reciprocating internal combustion engine in which the reciprocator of the motion conversion mechanism is reciprocating outside of the cylinder of the engine;

FIG. 13 schematically represents the structure of a plurality of motion conversion mechanisms connected in series;

FIG. 19 is a schematic view of a conventional reciprocating compressor using a stabilizing head;

FIG. 20 is a schematic view of a reciprocating compressor employing the motion conversion mechanism of the present invention.

DESCRIPTION OF THE PREFERRED EMBODIMENTS

In achieving the above mentioned objects, the motion conversion mechanism according to this invention comprises:

a rectangular-shaped reciprocator vertically sliding along a stationary reciprocator guide and supported by the reciprocator guide;

racks disposed on both of the inner sides of the reciprocator; and a pinion which rotates in the space between the above mentioned racks in a fixed position and has teeth at a part thereof for alternatively meshing with the racks during every half rotation of the pinion and every whole stroke of the reciprocator, including deceleration and acceleration means for the reciprocator and the pinion, and violence prevention means for preventing the conversion mechanism from departing from normal operation in the vicinity of the dead points of the reciprocator's reciprocating motion.

A reciprocating internal combustion engine according to the present invention has the above mentioned motion conversion mechanism disposed between a piston and a crankshaft.

In the following description, if not otherwise specified, the driving unit, that is, the pinion will be assumed to rotate counterclockwise.

An embodiment of a motion conversion mechanism of the present invention will be described referring to FIG. 1.

Figure 1:
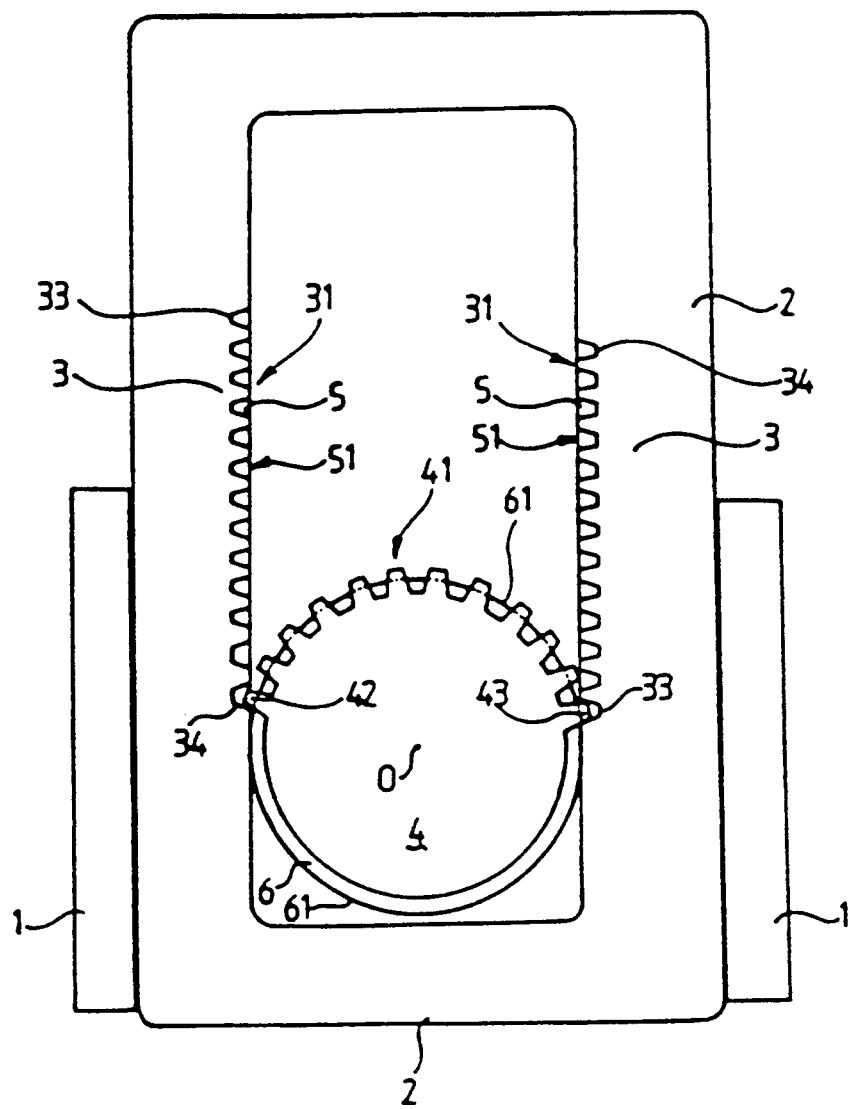
FIG. 1 is a schematic plan view of an embodiment of a motion conversion mechanism according to the present invention, showing the state immediately before the descent of the reciprocator after the ascent thereof.

FIG. 1 shows a rectangular reciprocator 2 sliding along reciprocator guides 1, 1 that are vertically supported.

A pair of racks 3,3 which possess reciprocator teeth 31,31 are disposed at the opposite inner sides of the reciprocator 2.

A pinion 4 rotates in the space between racks 3,3 about a fixed position 0. It has pinion teeth 41 along about a half of the circumference thereof.

A pair of first sliding members 5,5 possess first sliding faces 51,51 and a second sliding member 6 which possesses a second sliding face 61 slidingly contacts the first sliding faces 51,51.

The extended lengths of the pinion teeth 41 and the reciprocator teeth 42 and the first reciprocator tooth 34 of the rack 3 of one side start their meshing at the moment when the last pinion tooth 43 and the last reciprocator tooth 33 of the rack 3 of the other side depart from their contact with each other.

Meanwhile, the first sliding faces 51,51 and the second sliding face 61 continue their contact through the whole stroke.

At the moment when the last reciprocator tooth 33 and the last pinion tooth 43 depart from their contact with each other, the reciprocator 2 starts its downward movement upon the start of the contact between the first pinion tooth 42 and the first reciprocator tooth 34. Therefore, it is possible to make some modifications to the first and the last teeth 34,42,33,43 or the teeth near them to avoid interference between them.

Figure 3:
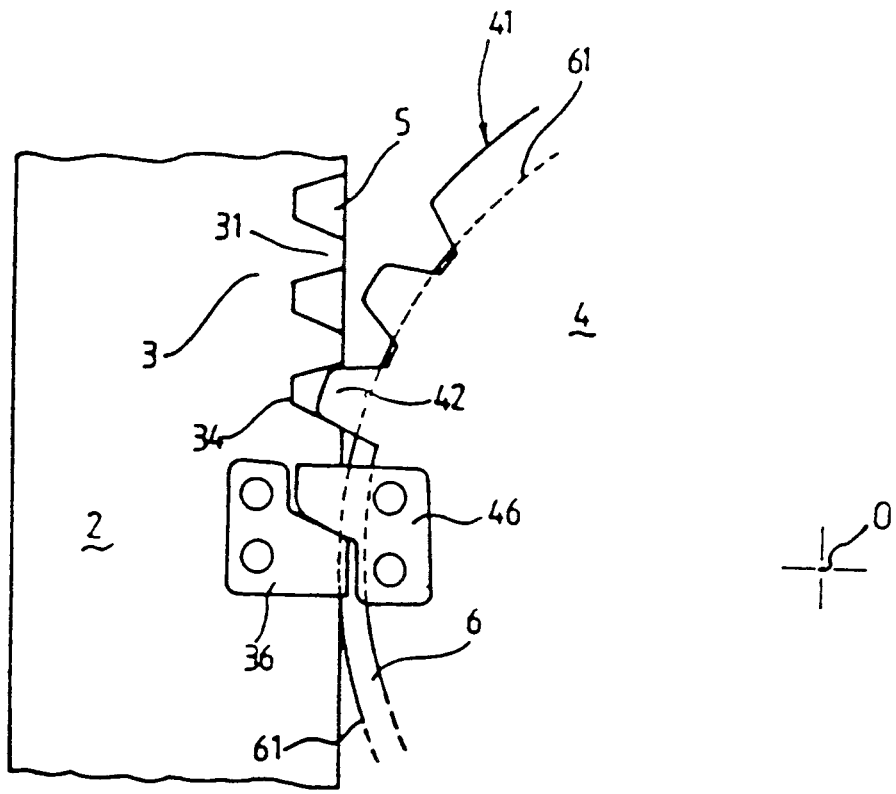
FIG. 3 is a plan view of a part of another embodiment of a motion conversion mechanism according to the present invention in which staired teeth are provided.

If there exists an uneasiness about the meshing between the first teeth 42,34, then a staired tooth 36 on the reciprocator 2 and a staired tooth 46 on the pinion 4 as illustrated in FIG. 3 can be provided.

The staired teeth 36,46, can be provided in the form of teeth having two or more steps.

Just before the downward movement of the reciprocator as illustrated in FIG. 1, the last pinion tooth 43 will come out of the tooth space of the last reciprocator tooth 33, and the first pinion tooth 42 will enter into the tooth space of the first reciprocator tooth 34.

Figure 2:
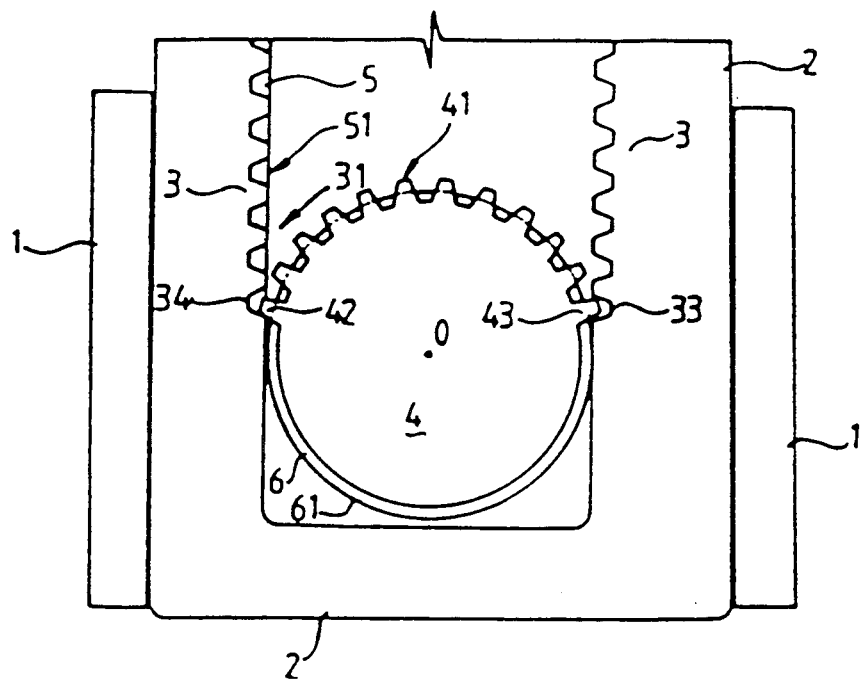
FIG. 2 is an illustration of the motion conversion mechanism of FIG. 1, showing the beginning of the descent of the reciprocator after the completion of the ascent thereof.

At the beginning of the downward movement of the reciprocator as illustrated in FIG. 2, after more counterclockwise rotation of the pinion, the last pinion tooth 43 will have completely come out of the tooth space of the last reciprocator tooth 33 while the first pinion tooth 42 and the first reciprocator tooth 34 will begin their contact.

If the staired teeth 34,46 are provided, they will also start their contact.

Upon further rotation of the pinion, and during the time when the reciprocator tooth 31 of the left side is meshed with the pinion tooth 41, the reciprocator tooth 31 of the right side will face the part of the pinion where the pinion teeth 41 are not provided, so the downward movement of the reciprocator may continue freely.

After a while, as the reciprocator 2 approaches the end of its downward movement, that is, just before it reaches its dead point, the above actions are repeated and the reciprocator 2 reverses its movement to the upward direction.

By repeating the above related actions, the reciprocator 2 will continue reciprocating within the range of the stroke due to the rotation of the pinion 4.

In the embodiment of FIG. 1, if the reciprocator 2 reverses its direction of movement instantaneously at every dead point, an intense mechanical impact due to inertia is expected. Therefore, there is a need for some countermeasure to decelerate and accelerate the reciprocator about every dead point of the reciprocator's movement unless the impact due to inertia is negligible.

For example, such a countermeasure will be required in a reciprocating internal combustion engine where a piston of considerable mass is reciprocating at a high speed.

A deceleration and acceleration means for a motion conversion mechanism according to the present invention will now be described.

In this embodiment, the deceleration and acceleration means has modified reciprocator and pinion teeth 31,41.

The principle of modifying the teeth 31,41 will be described by referring to FIG. 4 which utilizes a typical figure of a rack and pinion mechanism based on an involute curve, which is ordinarily used for general explanations.

$1a-1c$ indicates an involute curve which represents a normal tooth's contact face and $1d$ represents the contact face of a tooth of the rack.

$1a-1b$ indicates a transformed curve representing a modified tooth which is to reduce the speed of $1d$.

As the pinion 4 rotates and the involute curve $1a-1c$ slides in contact with $1d$, the common normal line $1i-1k$ at the contact point $1k$ always passes through the pitch point P and tangentially contacts the basic circle $1f$ at $1i$, so the rack 3 moves to the right at a constant speed. Then, if the involute curve $1a-1c$ and the rack contact face $1d$ are modified in a proper way, the rack can be decelerated or accelerated.

Here, for simplicity, only the curvature of the involute curve $1a-1c$ is modified, leaving $1d$ as a flat plane.

The involute curve $1a-1c$ is the locus of the end $1c$ of a thread that is assumed to have no thickness and no elasticity when the thread is unwound in a taut state from the basic circle with the thread end $1c$ first unwound from point $1a$.

Now, a variation on the unwound thread will be described. For example, the unwound thread can contract at a certain rate-linear or quadratic or other rate, the contraction occurring simultaneous with the unwinding. Then, the locus of the thread end $1c$ will be transformed into another curve shown by $1a-1b$ which has a reduced radius of curvature compared with involute curve $1a-1c$.

The case will be described in which this transformed curve $1a-1b$ drives the rack tooth $1d$.

Figure 4:
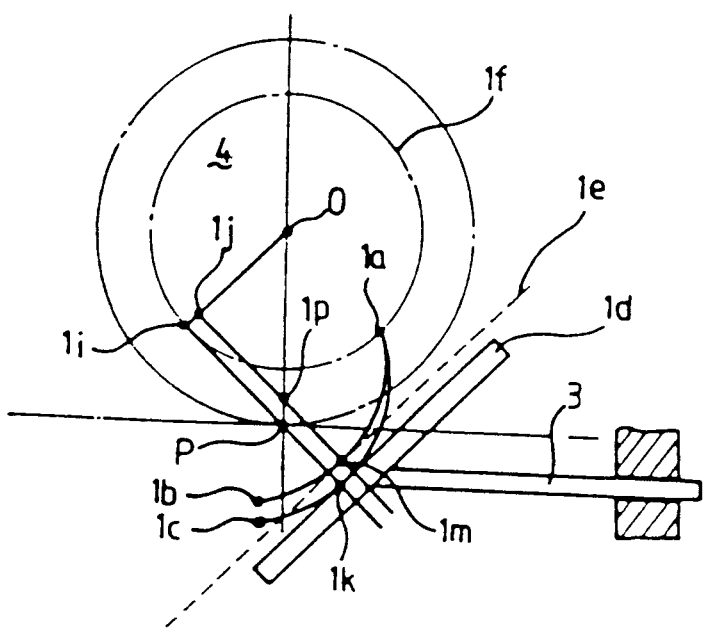
FIG. 4 shows a modification method for one of the teeth for decelerating or accelerating the reciprocator of a motion conversion mechanism according to the present invention.

When the pinion 4 has rotated as much as shown in FIG. 4, $1d$ will contact the transformed curve $1a-1b$ at the position of $1e$, and the common normal line at their contact point $1m$ will pass through point $1j$ on the radius $1i$-O and point $1p$ on the straight line which links the rotation center O of the pinion and the pitch point P. It can be easily seen that due to a delay in the rack movement after $1d$ has been driven by the transformed curve $1a-1b$, $1d$ will reach only position $1e$, and the instantaneous velocity of the rack 3 also will have been decelerated to a velocity equivalent to the ratio O1P/OP.

There are innumerable contact points before $1m$ after the first contact between $1d$ and $1a-1b$ at point $1a$, and the intersection of the straight line OP and the common normal line at every contact point mentioned above moves smoothly to point $1p$ from the pitch point P while the contact of $1d$ with $1a-1b$ progresses, eventually $1d$ or the rack 3 being decelerated.

On the other hand, it can be assumed that the unwound thread is elongated at a certain rate simultaneously with the unwinding.

Then, the transformed curve drawn by the locus of eventually, the reciprocator. Accordingly, it can be seen that a deceleration or acceleration between the pinion and the reciprocator can be achieved using the transformed tooth.

The above descriptions of transforming the tooth refer to a rack and pinion mechanism based on an involute curve for ease of understanding, but because the transformation can also be achieved with either the basic type of tooth of a cycloidal gear, other generalized basic gears, or even an unknown special type of basic tooth, there are various transforming methods and transformed tooth shapes.

Figure 5:
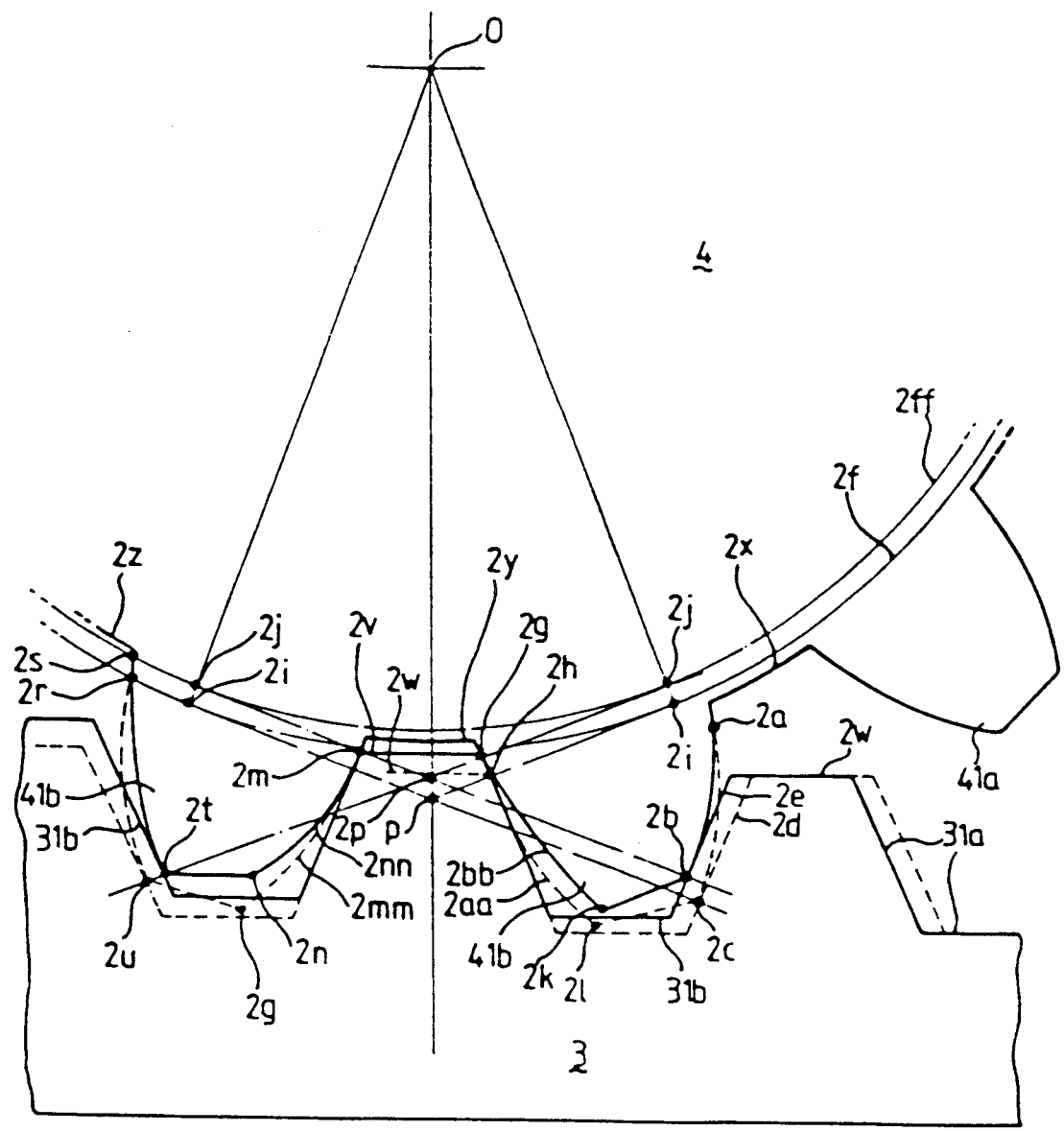
FIG. 5 is an exemplary view of the teeth of the rack and pinion, in which modification is performed based on the method of FIG. 4.

FIG. 5 shows a more specific example of transformed teeth based on the principle of FIG. 4 and more visualized descriptions will follow.

Teeth of the pinion and the rack which are not transformed will be called a normal pinion tooth $41a$ and a normal reciprocator tooth $31a$.

In the figure, a first transformed pinion tooth $2bb$ is at the instant of ending contact with the rack 3 and a second transformed pinion tooth $2nn$ is at the instant of starting contact with the rack 3. An imaginary pinion tooth $2aa$ which is illustrated $2f$ as its basic circle as does the normal pinion tooth $41a$.

The first transformed tooth $2bb$ will be described first. $2a-2b$ is a transformed curve made from the involute curve $2a-2c$ by a similar transforming method to that of FIG. 4, involute curve $2a-2b$ decelerating the rack 3.

The position of advancement of $2d$ at the moment when involute curve $2a-2c$ starts contacting $2d$ at point $2a$ and the position of advancement of $2e$ at the moment when transformed curve $2a-2b$ starts other, and at the same moment, $2d$ and $2e$ have the same instantaneous velocity because the common normal line at point $2a$ passes through the pitch point P.

Then, as the pinion 4 rotates, the intersection point of the straight line OP and the common normal line at the contact point between $2a-2b$ and $2e$ moves smoothly toward the pinion rotation center O up to point $2p$ after starting from the pitch point P, and accordingly $2e$ or the rack 3 is decelerated and eventually its position becomes as illustrated in FIG. 5.

On the other hand, transformed curve $2g-2k$ which is the rear contact face of the first transformed pinion tooth $2bb$ begins its contact with the rack 3 starting from point $2k$, and after a continuous contact with the rack 3, the transformed curve ends its contact with the rack 3 a point $2g$ as illustrated in FIG. 5.

Therefore, the two common normal lines at the two simultaneous contact points (one in face $2a-2b$ and another in face $2g-2k$) pass through the same point on the straight line OP, and their passing point is moved smoothly toward the pinion rotation center O up to point $2p$ as illustrated in FIG. 5.

Consequently, the last contact point $2g$ of the rear transformed curve $2g-2k$ is a point located somewhat nearer to the pinion rotation center O than the last contact point $2h$ of the rear contact face $2h-2l$ of the imaginary involute tooth $2aa$. Accordingly, the bottom $2y$ and the end face $2v$ behind the rear transformed curve $2g-2k$ become nearer to the pinion rotation center O than the bottom $2x$ and the end face $2w$ which are positioned in front of transformed curve $2a-2b$ respectively.

The description will be almost the same for the second transformed tooth $2nn$ as for the first transformed tooth $2bb$, and therefore only a brief mention will be made below.

An imaginary involute tooth 2mm has point 2p as its pitch point and has 2ff as its basic circle, and accordingly 2ff tangentially contacts the common normal lines 2b-2p and 2g-2p which are respectively set up at the last contact points 2b and 2g of the first transformed tooth 22bb.

Then, the second transformed tooth 2nn is transformed from 2mm.

The two common normal lines at the two simultaneous contact points in both the front and the rear sides of the transformed tooth 2nn also pass through the same point on the straight line OP, and the point through which they pass also moves smoothly toward the pinion rotation center O, so that the rack 3 is eventually the decelerated as the pinion 4 rotates counterclockwise. Thus the transformation provides smooth linkability between the two transformed teeth 2bb, 2nn in such a manner that the movement of the intersection point of the common normal line and the straight line OP is smooth up to point 2p, passing point 2p and beyond.

The last contact point 2s of the rear transformed curve 2s-2t and the bottom 2z behind 2s-2t become nearer the pinion rotation center O than 2g and 2y, respectively.

In other words, in the case when the pinion 4 decelerates the rack 3, the transformed teeth of the pinion 4 and the rack 3 will be at positions advanced toward the pinion rotation center O, and the common normal line also moves smoothly or gradually toward the pinion rotation center O.

The above description assumes that the second transformed tooth 2nn begins contact with the rack 3 as soon as the first transformed tooth 2bb terminates its contact with the rack 3.

However, the above descriptions are applicable also to the case where the contact of the first and second transformed teeth are overlapped for a period.

The case where the pinion 4 accelerates the rack 3 can be understood by imagining the reverse case, for example, in which the pinion 4 of FIG. 5 rotates in the reverse direction or clockwise. In this case, the pinion 4 accelerates the rack 3 leftward and the intersection point of the common normal line with the straight line OP moves away from the pinion rotation center O to the pitch point P.

For convenience, the transformed pinion tooth which accelerates or decelerates the rack when rotating counterclockwise will be called an acceleration or a deceleration pinion tooth, respectively. The transformed reciprocator tooth which contacts with the transformed pinion tooth will be called an acceleration or a deceleration reciprocator tooth. A tooth of the pinion or the rack which is not transformed will be called a normal pinion tooth or a normal reciprocator tooth. Each of the teeth classified as above can be connected freely with each other.

All the above descriptions were made based on the concept of a spur gear. Therefore, the transformation of the teeth was described only by referring to the circumferential direction. However, in the case of a stepped gear, a helical gear, or other kinds of gears, the transformation for achieving deceleration and acceleration of the rack can also be performed along the direction of the tooth width.

Figure 8:
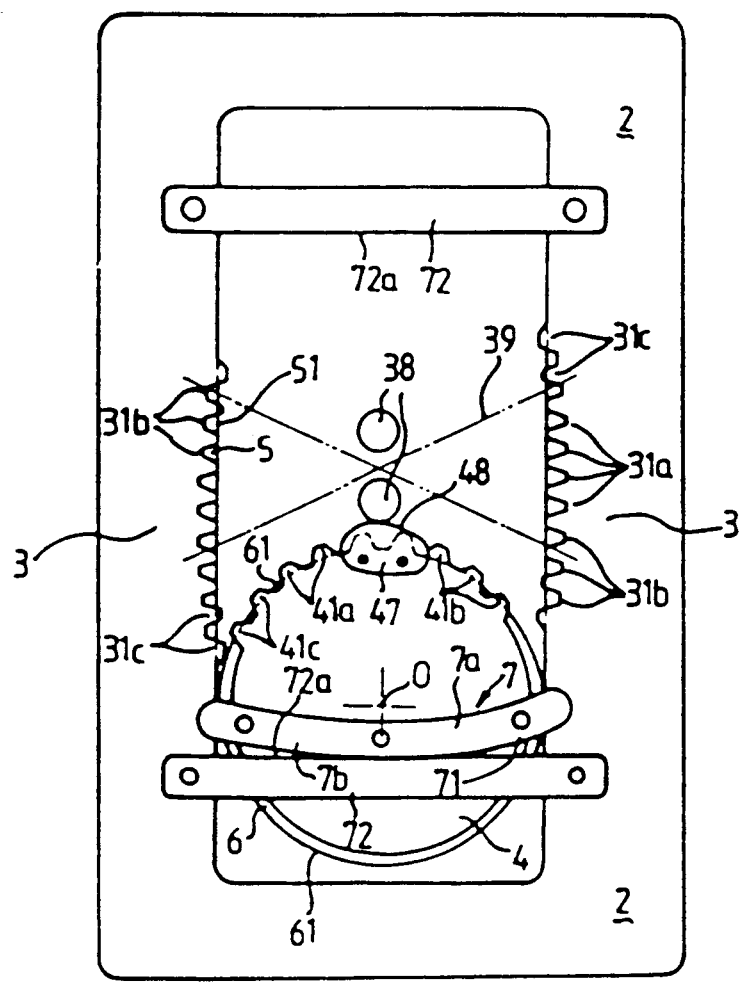
FIG. 8 is a schematic plan view of another embodiment of a motion conversion mechanism according to the present invention which is provided violence prevention means.

Another deceleration and acceleration means for the reciprocator in a motion conversion mechanism according to the present invention utilizes a deceleration and acceleration cam and a third sliding member. As illustrated in FIG. 8, a deceleration and acceleration cam 7 which possesses a cam sliding face 71 is provided on the pinion 4 and a third sliding face 72a is provided on the reciprocator 2.

The principle of decelerating and accelerating the reciprocator will be described by referring to FIG. 6 which is drawn schematically.

For convenience, it is assumed that the third sliding face 72a is a plane face which is perpendicular to the direction of reciprocator movement. 3a, 3b, 3c, 3d, and 3e indicate the relative positions of the third sliding face 72a with respect to the cam sliding face 71 which is rotating as the pinion 4 rotates. The sliding face 72a is shown as if it is rotating instead of the cam sliding face 71. 3h, 3i, 3g, and 3j indicate the contact points between the cam sliding face 71 and the third sliding face 72a.

Figure 6:
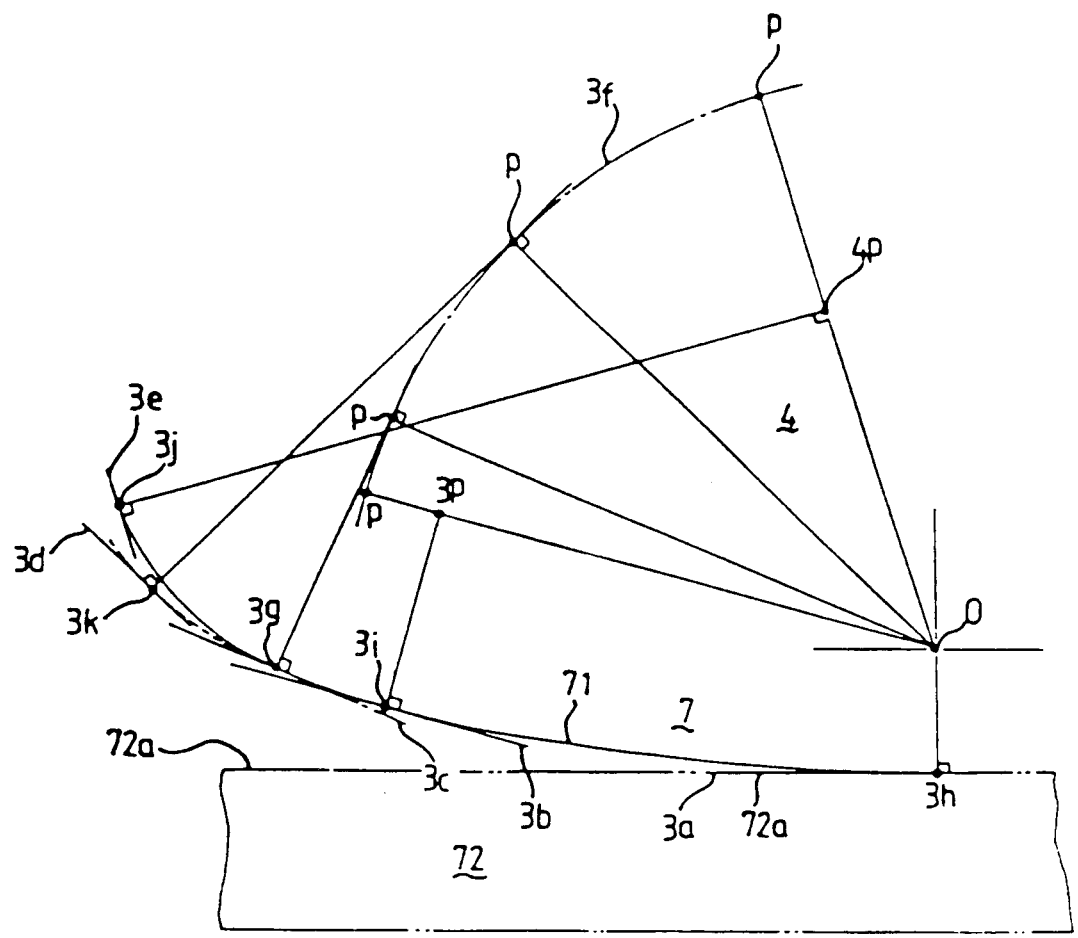
FIG. 6 shows the principle of a deceleration/acceleration cam used for decelerating/accelerating the reciprocator of a motion conversion mechanism according to the present invention.

Referring to FIG. 5 and FIG. 6, because the direction of movement of the third sliding face 72a in FIG. 6 coincides with the direction of movement of the rack 3 in FIG. 5, the straight line OP in FIG. 5 also coincides with the perpendicular lines O3p and O4p in FIG. 6 which are drawn from the pinion rotation center O perpendicular to the common normal lines which originate from the contact point between the cam sliding face 71 and the third sliding face 72a. Accordingly, 3f in FIG. 6 coincides with the pitch circle of the normal pinion teeth 41a in FIG. 5. 3a indicates the position of the third sliding face 72a of the third sliding member 72 at the moment when the reciprocator is at its upper dead point, and at this moment, the common normal line originating from the contact point 3h between the cam sliding face 71 and the third sliding face 72a passes through the pinion rotation center O. Consequently, the reciprocator velocity becomes zero.

Now it will be assumed that the contact point 3i is any point between 3h and 3g, and that 3p is the foot of the line drawn from the pinion rotation center O to the common normal line at 3i. When the pinion 4 has rotated a little beyond the above assumed position, if the foot of the line from the pinion rotation center O perpendicular to the common normal line originating from the contact point between the cam sliding face 71 and the third sliding face 72a becomes separated a little farther from the pinion rotation center O compared with the above assumed foot 3p, then the cam sliding face 71 will accelerate the third sliding face 72a or the third sliding member 72.

Now, it will be assumed that the contact point 3j is any point behind 3g, and that 4p is the foot of the line drawn from the pinion rotation center O perpendicular to the common normal line originating from 3j. When the pinion 4 has rotated a little beyond the above assumed position, if the foot of the line from the pinion rotation center O perpendicular to the common normal line originating from the contact point between the cam sliding face 71 and the third sliding face 72a becomes a point nearer to the pinion rotating center O compared with the above assumed foot 4p, then the cam sliding face 71 will decelerate the third sliding face 72a or the third sliding member 72.

If the common normal line originating from contact point 3g tangentially contacts the pitch circle 3f as illustrated in FIG. 6, and when the normal pinion teeth 41a in FIG. 5 contact the normal reciprocator teeth 31a in FIG. 5, if the reciprocator velocity is called the normal velocity, then the third sliding face 72a or the reciprocator will be accelerated from a zero velocity up to the normal velocity by the cam sliding face 71 between 3h and 3g, and then will be decelerated below the normal velocity by the cam sliding face 71 after point 3g. On the other hand, if an involute curve is linked to the cam sliding face 71 after 3g as shown by a dotted line in FIG. 6, the third sliding face 72a or the reciprocator will maintain its normal velocity with the help of the cam sliding face 71 after 3g. Of course, the above two cam sliding faces are linked to cause the movement of the intersection point of the common normal line and the straight line OP which coincides with the perpendicular line from the rotation center to be smooth at and around the link point 3g.

The section of the cam which decelerates the reciprocator will be called the deceleration cam, and the section of the cam which accelerates the reciprocator will be called the acceleration cam. The deceleration and acceleration means utilizing the deceleration and acceleration cam is operational at and around the dead point of the reciprocator. In this context, the two deceleration/acceleration means in the form of a cam and in the form of transformed teeth can be used together.

In FIG. 8, there is shown a preferred constitution of the motion conversion mechanism according to the present invention employing the deceleration and acceleration means whose basic structures were described by referring to FIGS. 4, 5, and 6, and there, all the members are at their upper dead point positions. The acceleration pinion teeth 41c, the normal pinion teeth 41a and the deceleration pinion teeth 41b are provided along a part of the circumference of the pinion 4, and a deceleration/acceleration cam 7 is disposed on the opposite half of the pinion 4 from the teeth portion.

Now, the action of an example of the motion conversion mechanism according to the present invention having deceleration and acceleration means will be described while referring to FIG. 8.

As the pinion 4 progresses in its rotation from the illustrated upper dead point of FIG. 8, the reciprocator 2 will begin to be accelerated downward from a zero velocity through the contact between the acceleration cam 7b and the third sliding face 72a. Then, the acceleration of the reciprocator 2 will continue due to the contact between the acceleration pinion teeth 41c and the acceleration reciprocator teeth 31c. Then, as the contact between the normal pinion teeth 41a and the normal reciprocator teeth 31a continues, the reciprocator 2 will maintain the normal velocity. As the contact between deceleration teeth 41b, 31b continues, the reciprocator 2 will be decelerated and will continue the deceleration by the contact between the deceleration cam 7a and the third sliding face 72a, thereby ultimately reaching the lower dead point at which it has a zero velocity. Then, the reciprocator 2 is accelerated reversely upwards, and then, being accelerated and decelerated as described above, the reciprocator 2 again reaches the upper dead point of FIG. 8. Consequently, the reciprocator 2 continuously reciprocates through a predetermined stroke. However, during the contact between the cam sliding face 71 and the third sliding face 72a, the movement of the reciprocator is governed only by the cam sliding face 72a and is not secured against a force from behind the cam sliding face 71. Accordingly, if some unexpected violent force should act on the reciprocator 2 from behind the deceleration and acceleration cam 7, the sliding contact between the cam sliding face 71 and the third sliding face 72a can be disrupted, and eventually the motion conversion mechanism will lose its normal operational function. Accordingly, some safeguard against a possible disruption of the operation of the motion conversion mechanism is necessary. This safeguard will be called a violence prevention means.

An example of the violence prevention means 47, 38 is illustrated in FIG. 8 schematically, and a description of it will be presented below.

In the drawing, two violence prevention rollers 38,38 are disposed on a bridge 39 which spans the opening between the opposite side frames of the reciprocator 2. The rollers 38,38 are symmetrically disposed with respect to the center of the reciprocator 2.

Figure 7:
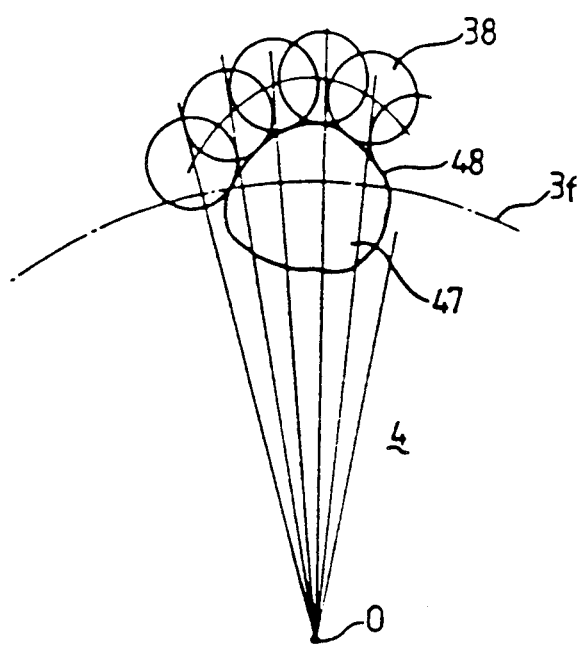
FIG. 7 is a schematic plan view showing the relationship between the locus of a violence prevention roller and the face of a violence prevention cam of a violence prevention means.

On the other hand, a violence prevention cam 47 which possesses a violence prevention face 48 which alternately contacts with the violence prevention rollers 38,38 is disposed on the pinion 4. The violence prevention face 48 can be obtained from the locus of the violence prevention rollers 38, 38, the locus being drawn on the rotating pinion 4. Namely, a properly selected part of a curve which tangentially contacts the inside of the locus of the reciprocating violence prevention rollers 38,38 in the vicinity of the dead point of the reciprocator becomes the violence prevention face 48 as shown schematically in FIG. 7.

An example of the operation of the violence prevention rollers 38,38 and the violence prevention cam 47 will be described below while referring to FIG. 8.

If the violence prevention cam 47 and the violence prevention rollers 38,38 begin contact before the end of the contact between deceleration teeth 41b,31b, then the violence prevention face 48 will push a violence prevention roller 38 upward, and consequently will aid the upward movement of the reciprocator 2. At this time, the reciprocator 2 will be driven upward exclusively by the face 48 without the help of the deceleration teeth 41b, 31b during the period of contact of only the deceleration cam 7a and the third sliding member 72. Then, during the period when the acceleration cam 7b contacts the third sliding member 72, a violence prevention roller 38 pushes the violence prevention cam 47 downward and aids the reciprocator 2 in driving the pinion 4 to rotate it counterclockwise. Further, the contact between the violence prevention rollers 38,38 and the violence prevention cam 47 prevents the cam sliding face 71 and the third sliding face 72a from becoming separated. In this case, the two common normal lines at the contact points between a violence prevention roller 38 and the violence prevention cam 47 and at the contact point between the third sliding face 72a and the cam sliding face 71 will meet at a point on the straight line OP, which means that the instantaneous velocities of the above four components are equal to each other. An arrangement of the mechanism will be described below in which the respective corresponding elements have an independent movement plane so as to move freely without interference between them. The description of each movement plane for the elements of the pinion shown in FIG. 9, which is a side view of the pinion 4 of FIG. 8, also applies to each movement plane of the corresponding elements of the reciprocator 2.

Figure 9:
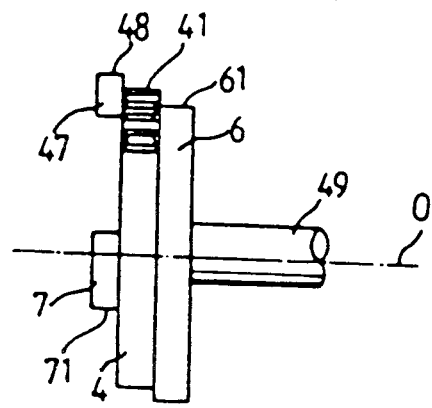
FIG. 9 is a side view of the pinion of FIG. 8, showing that every element of the pinion has its own movement plane.

FIG. 9 illustrates three movement planes of independent character. The violence prevention cam 47 and the deceleration and acceleration cam 7 have one movement plane in common, the pinion teeth 41 have another movement plane, while the second sliding member 6 has yet another movement plane. Each of the violence prevention rollers 38,38, the third sliding member 72, the reciprocator teeth 31 of the rack 3, and the first sliding member 5 moves freely without interference and has the same movement plane as corresponding elements of the pinion 4. Although it is not illustrated in FIG. 9, the bridge 39 in FIG. 8 where the violence prevention rollers 38, 38 in FIG. 8 are located also has another independent movement plane, and passes by the opposite side of the pinion 4 from the pinion shaft 49. Accordingly, the motion conversion mechanism operates freely as a whole.

Figure 10:
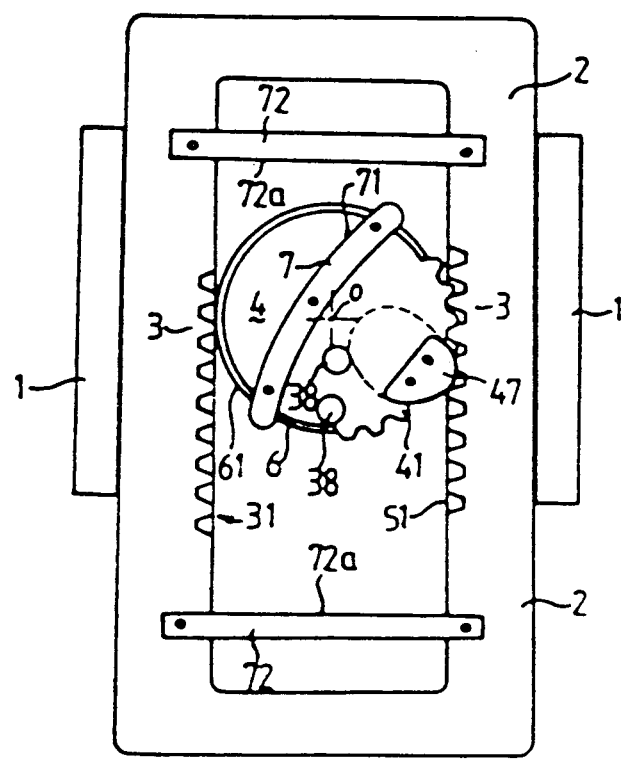
FIG. 10 is a plan view of the motion conversion mechanism showing that the violence prevention roller of FIG. 8 and the pinion of the mechanism can be actuated without interfering with each other.

Looking at the movement of the violence prevention rollers 38, 38 a little more closely, the inner curve of the locus drawn by the violence prevention rollers 38,38 resembles the dotted curve in FIG. 10, and the outer curve passes by the back side of the deceleration and acceleration cam 7.

Besides the above mentioned embodiment, the violence prevention rollers 38, 38 may be provided on the pinion 4 and the violence prevention cam 47 may be provided on the reciprocator 2, or the violence prevention cams may be provided on both the reciprocator 2 and the pinion 4, or a tracing groove may be provided for a roller or pin to trace along the groove.

The above descriptions which began with FIG. 1 are only of some preferred examples, and many other variations can be derived from the above mentioned basic idea of the motion conversion mechanism according to the present invention.

For example, it is possible either that the second sliding member 6 be made in the form of a rectangular shaped slider between both sides of the first sliding members 5,5, and the pinion shaft 49 be installed to rotate freely in a hole of the slider, or that the first and the second sliding members 5,5,6 be removed.

Figure 21:
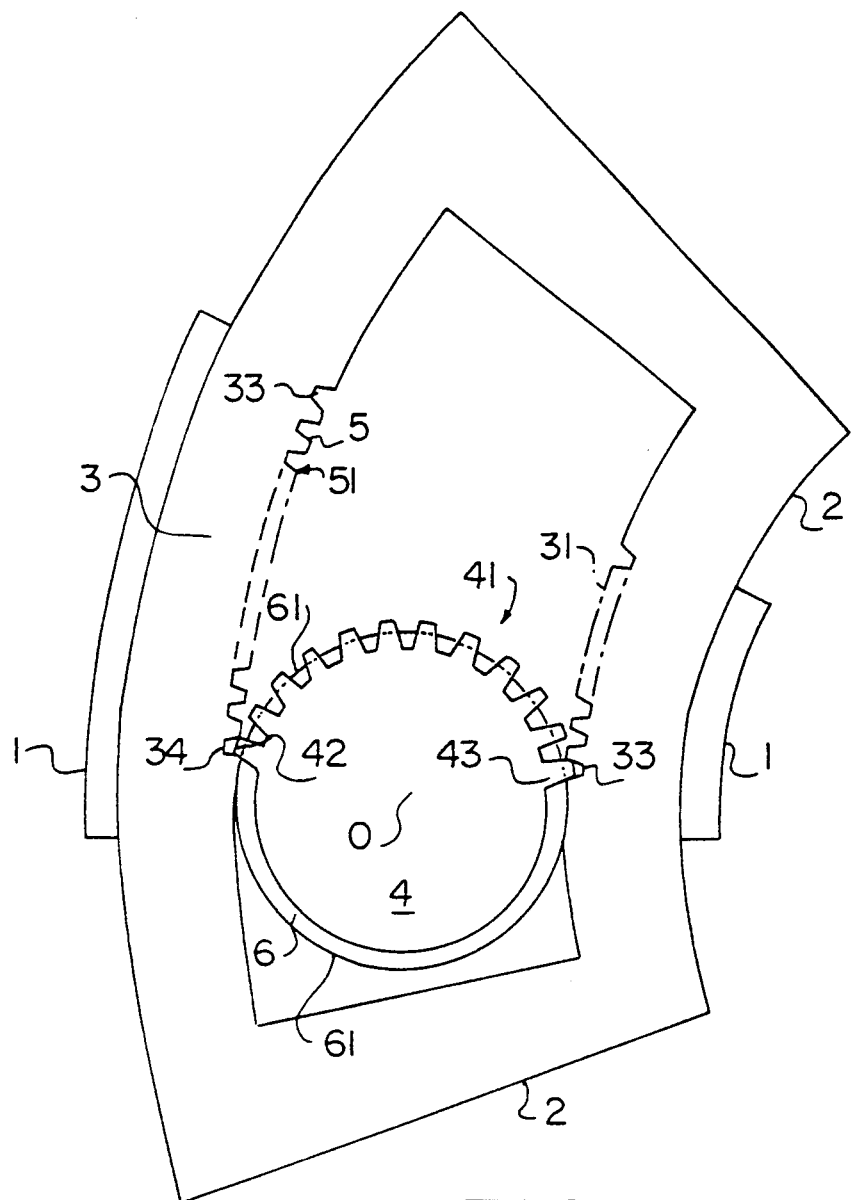
FIG. 21 is a schematic plan view of another embodiment of a motion conversion mechanism according to the present invention having an arcuate reciprocator.

All the above descriptions were made on the basis that the reciprocator 2 should reciprocate along a simple straight line. However, it is also possible for the reciprocator 2 to be formed in the shape of a circular arc, as schematically illustrated in FIG. 21. Then the reciprocator 2 will reciprocate along a track of a circular arc as observed from a side.

In this case, the racks 3 also are changed into the shape of a circular arc and become similar to a bevel gear or a spiral gear, and the pinion 4 also is changed to correspond to the reciprocator 2 with all the corresponding elements.

The above-described embodiments of the motion conversion mechanism of the present invention represent only the basic idea for the better understanding of the present invention and they are applicable to almost all mechanical fields where a conventional motion conversion mechanism has been utilized such as in internal combustion engines, compressors, machine tools, and the like.

Now, embodiments of a reciprocating internal combustion engine of a new system adopting the above-described motion conversion mechanism of the present invention will be described.

First, an embodiment of a straight reciprocating internal combustion engine which is made by applying the motion conversion mechanism of the present invention to a conventional reciprocating internal combustion engine will be described while referring to the schematic drawings of FIG. 11 and FIG. 12.

FIG. 11 shows an engine where a reciprocator 2 is moving while inserted into a cylinder 8, and the pistons 9,9 of the cylinders 8,8 are provided at both ends of the reciprocator 2.

FIG. 12 shows an engine where a reciprocator 2 is too large to enter the cylinder 8, and therefore the piston 9 of the cylinder 8 is connected with the reciprocator 2 at the outside of the cylinder 8 by an extension rod 10, a piston being provided at only one end of the reciprocator 2. The extension rod 10 shown in FIG. 12 has no hinge and looks like an extension from the end of the reciprocator body.

Examples of methods of connecting the piston 9 with the reciprocator body of the extension rod 10 are shown in FIG. 11 and FIG. 12.

When the piston 9 is connected to form an integral body with the end of the reciprocator body or the extension rod 10 as shown in FIG. 12, it is possible to intercept the direct heat flow from the piston 9 to the reciprocator 2 or the extension rod 10 by installing a network of oil lines at a proper position below the piston head, as represented by a dotted line in FIG. 12, and by supplying oil under pressure to the network.

When the piston 9 is connected with the reciprocator 2 or the extension rod 10 by a hinge or similar element and by making the piston 9 and the reciprocator 2 or the extension rod 10 contact each other face to face, as represented by a double dotted line and a small circle in FIG. 11, then it is possible to intercept the direct heat flow from the piston 9 to the reciprocator 2 or the extension rod 10 by supplying oil to the clearance where the piston 9 and the reciprocator 2 or the extension rod 10 contact face to face. It is also possible to insert some elastic elements so as to absorb possible vibration of the piston 9 due to unbalanced gas pressure in the cylinder 8 and to stabilize the motion conversion mechanism.

The basic engine can be connected in series or in a V-type, an X-type and the like as in the case of a conventional engine by providing, as shown in FIG. 13, pinions 4 on both ends of a pinion shaft 49 and by transmitting mechanical power between the pinion 4 and the power shaft 49b through link gears 49a, 49a which are installed on both the pinion shaft 49 and a power shaft 49b.

Now, an embodiment of an oscillatory reciprocating internal combustion engine employing the motion conversion mechanism of the present invention will be described while referring to FIG. 14 and FIG. 15.

The oscillatory reciprocating engine of the present invention has the characteristic that it employs the motion conversion mechanism of the present invention and a piston base wheel 17 in order to install many pistons 12 in a basic engine unit.

A ring-shaped piston base wheel 17 which is provided with a cut-out portion near its peripheral edge is installed in a flat and round contoured casing 11 by disposing its oscillation shaft 16 at the center of the casing 11.

The freely rotable oscillation shaft 16 is provided at the center of the piston base wheel 17, and the piston base wheel 17 and the oscillation shaft 16 are connected with each other by means of a connection element such as a web 17a.

Three protruded pistons 12 are provided on the outer circumferential face of the piston base wheel 17, and the motion conversion mechanism is linked by means of a link pin 14 to the piston base wheel 17 through the cut-out portion of the piston base wheel 17 so that the piston base wheel 17 and the protruded pistons 12 can move in an oscillatory reciprocating motion.

Each of a plurality of limited spaces 12 has a shape as illustrated in the drawing and is surrounded by a circular inner face 11a of the casing 11, a side 12a of the protruded piston 2, a circular outer face 17b of the piston base wheel 17, and a partition wall 15 of the casing 11 and serves as a working chamber for the combustion of fuel.

This working chamber's volume changes in accordance with the oscillatory reciprocating motion of the protruded piston 12. Each of the working chambers performs independent fuel combustion if independent fuel-air supply systems, ignition systems, gas exhaust systems, and the like are provided.

Figure 14:
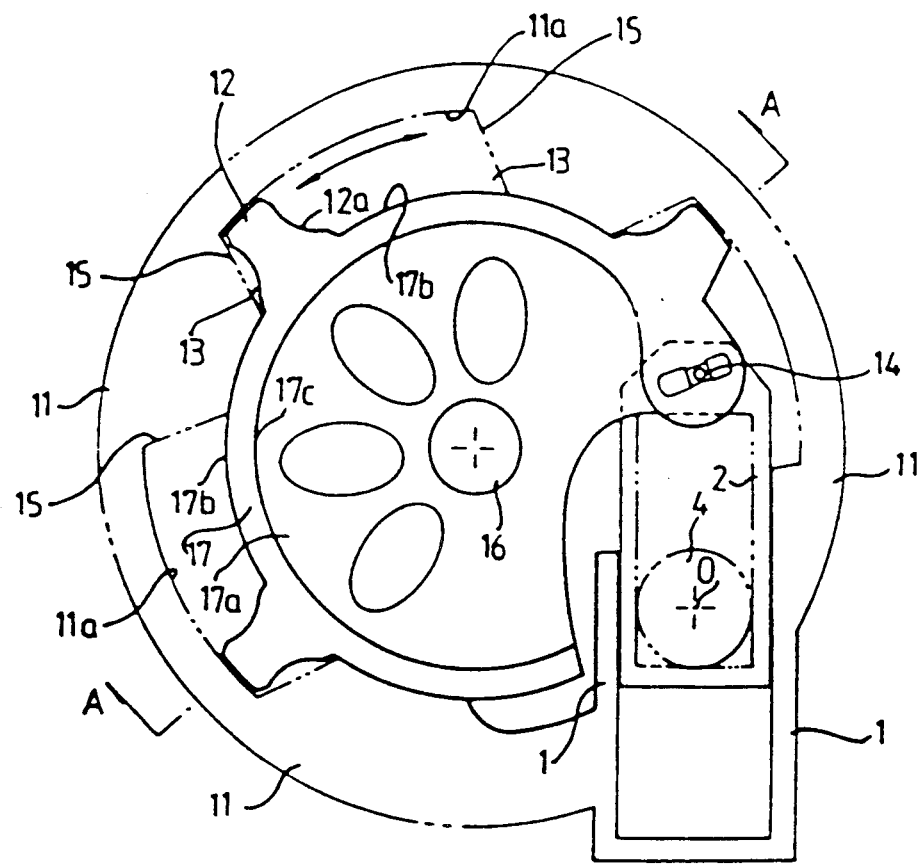
FIG. 14 is a schematic plan view of an embodiment of an oscillatory reciprocating internal combustion engine according to the present invention.
Figure 15:
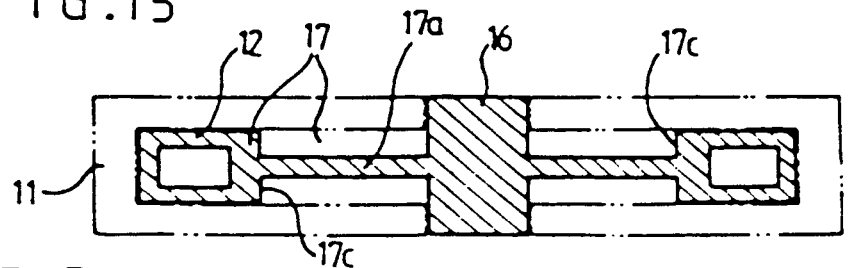
FIG. 15 is a sectional view taken along line A—A of FIG. 14.

The link pin 14 in FIG. 14 moves in a linear reciprocating motion, while the link pin hole in the piston base wheel 17 moves in an oscillatory reciprocating motion so that the link pin 14 slides in the link pin hole of the piston base wheel 17.

Figure 16:
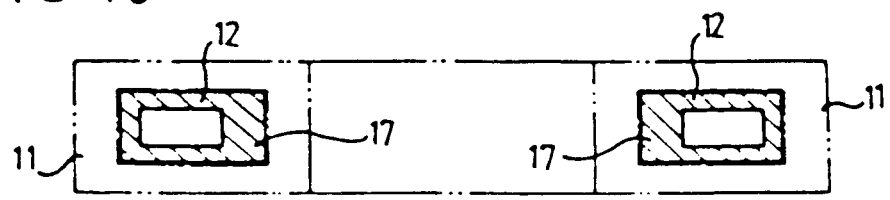
FIG. 16 is a sectional view taken along line A—A of FIG. 14 in which the oscillation shaft and the connection element for connecting the oscillation shaft and the piston base wheel of FIG. 14 are removed, thereby forming a doughnut-shaped engine.

An adaptation of the above oscillatory reciprocating engine, which has no oscillation shaft 16 and no connection web 17a as shown in FIG. 16, can be obtained by letting the casing 11 support the inner circular face 17c of the piston base wheel 17 and by letting the piston base wheel 17 move in oscillatory reciprocating motions by sliding on the casing portion which supports the inner circular face 17c of the piston base wheel 17. An oscillatory reciprocating internal combustion engine of this type has a doughnut-shaped form as shown in FIG. 16.

Figure 17:
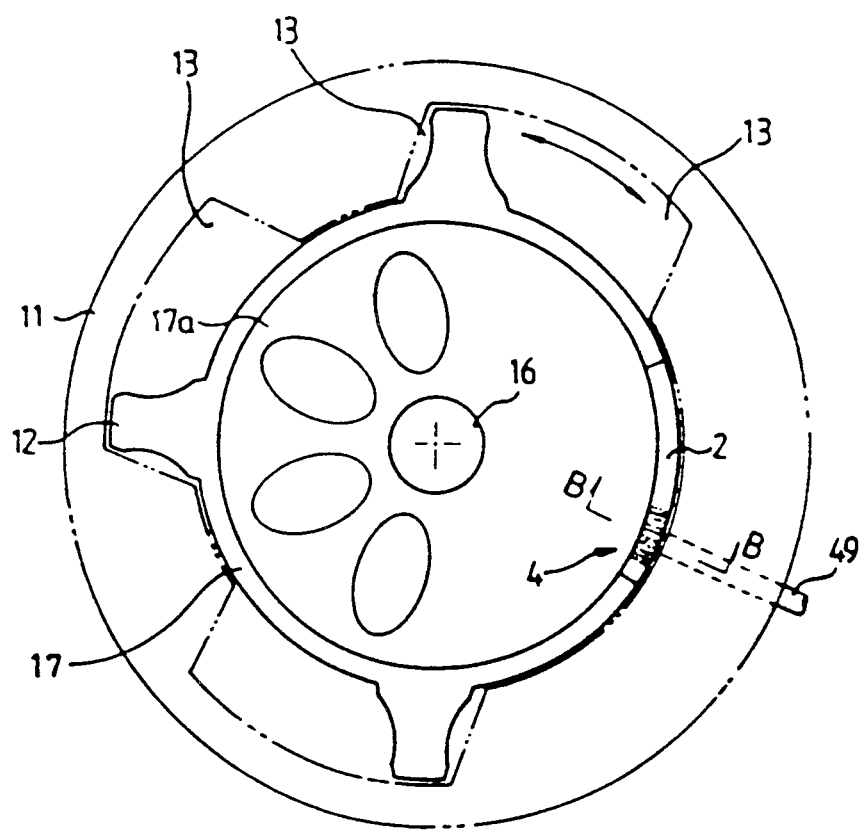
FIG. 17 is a schematic plan view of another embodiment of an oscillatory reciprocating internal combustion engine according to the present invention in which the oscillation shaft of the piston base wheel and the pinion shaft of FIG. 14 are perpendicular to each other.
Figure 18:
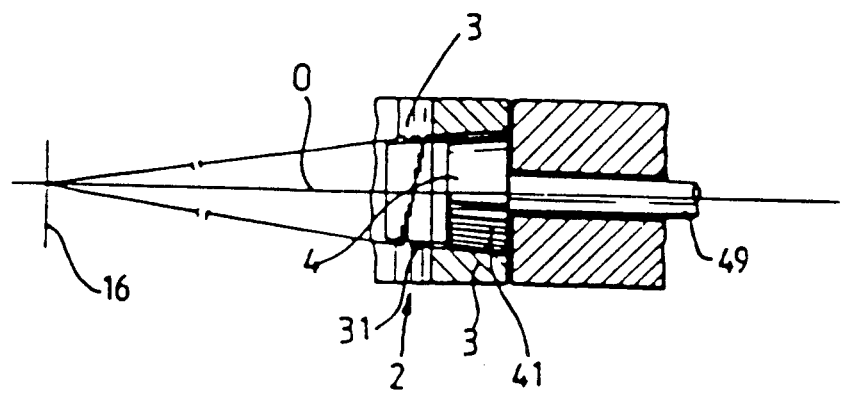
FIG. 18 is a sectional view taken along line B—B of FIG. 17.

Another adaptation of the oscillatory reciprocating internal combustion engine is constituted such that its pinion shaft 49 is perpendicular to the oscillation shaft 16 and its reciprocator 2 is formed in the shape of a circular arc and is installed in the cut-out portion of the piston base wheel 17 end to end as illustrated in FIG. 17 and FIG. 18.

Accordingly, the reciprocator 2 moves in oscillatory reciprocating motions along a track of a circular arc, while the racks 3,3 have a shape similar to a bevel gear or a spiral gear.

Meanwhile, the pinion 4 also changes its shape correspondingly with the change of the reciprocator 2, with all the other corresponding elements of the pinion 4. The reciprocator 2 is also changed in the same manner.

In this case also, a doughnut-shaped engine without the oscillation shaft 16 and the web 17a can be obtained.

As all the above descriptions for the reciprocating internal combustion engine and the motion conversion mechanism of the present invention are made based on embodiments or examples, it should be understood that it is possible to make many alterations, such as changing the direction of the pinion shaft or the oscillation shaft, by altering the normal and the transformed teeth of the rack and the pinion through the utilization of a helical gear or a spiral gear or any other non-generalized teeth, by changing the shapes of all the other elements or their installation positions, or by substituting friction members for the pinion and reciprocator teeth without falling outside the scope of the present invention.

The effects of the reciprocating internal combustion engine of the present invention on engine efficiency, engine power, and engine size will be briefly described below.

First, the engine efficiency or the combustion efficiency and the engine power can be expected to be improved because the piston speed can be controlled through the whole stroke.

Second, because the reciprocator 2 or the piston base wheel 17 can be stabilized by the reciprocator guide 1,1 or the engine casing 11, the piston 9, 12 can also be stabilized without violent friction between the piston and the cylinder wall.

Third, because the piston force almost always acts tangentially on the pinion 4 or the pinion shaft 49, power transmission will be effective.

Further, because the connecting rod and the crank of the conventional engine can be omitted, the engine size can become smaller and lighter.

By absorbing the rapid increase of the gas pressure in the early stage of combustion through control of the piston speed, all reciprocating internal combustion engines including gasoline engines and diesel engines can be expected to approach as close as possible to the ideal constant pressure cycle engine, and accordingly, by increasing the compression ratio and supercharging the intake gas, which can be easily effected, the engine power and efficiency can be expected to be highly improved, and simultaneously, by control of the piston speed in the combustion preparation period and in the combustion period, the fuel combustion speed can be highly promoted or the control of abnormal combustion can be expected to be easily obtained.

Further, the maximum gas temperature can be expected to be lowered in spite of the fast fuel combustion speed so that the heat energy loss caused by heat transfer, the increase of specific heat, and heat of dissociation of the burned gas can be expected to be minimized in the early stage of combustion. Accordingly, drastic improvement of the engine efficiency, engine power and other engine functions can be expected.

On the other hand, the motion conversion mechanism of this invention can be expected to be widely utilized in almost all fields requiring a motion conversion mechanism between rotating parts and reciprocating parts such as machine tools, pumps, compressors, engines, and the like.

For example, the schematic constitutions of a conventional reciprocating compressor and a novel reciprocating compressor utilizing the motion conversion mechanism of this invention are illustrated in FIG. 19 and FIG. 20. FIG. 19 shows a conventional reciprocating compressor utilizing a stabilizing head 10c and a piston rod 10b between the piston 10a and the crank-connecting rod mechanism 10d to stabilize the motion of the piston 10a, while FIG. 20 shows a novel reciprocating compressor where the piston 10a is directly mounted on the motion conversion mechanism of this invention through a piston rod 10b without any other special auxiliary means because the reciprocating motion itself of the piston 10a or the reciprocator 2 is stabilized by the reciprocator guide 1,1.

If the reciprocating compressor shown in FIG. 20 is used, an increase of the volumetric efficiency, which is directly related to the compression efficiency, can be expected because the piston speed can be controlled properly.

As another example, in the case of cutting machines, a uniform cutting tool speed can be easily obtained almost directly by employing the motion conversion mechanism of this invention without any complicated auxiliary mechanism with the result that the cutting machines can have small sizes.

What is claimed is:

1. A motion conversion mechanism for converting between rotating motion and reciprocating motion comprising:
   a reciprocator including two inner opposed sides and two racks, one rack being disposed on each of the inner sides, at least one of the racks having an acceleration/deceleration tooth;

a guide supporting the reciprocator for reciprocating movement; and a pinion disposed between the racks of the reciprocator, having a circumference and pinion teeth disposed along part of the circumference, the pinion teeth alternatively engaging the respective racks, the pinion rotating about an axis in response to reciprocating movement of the reciprocator, the pinion having an acceleration/deceleration tooth engaging the acceleration/deceleration tooth of the rack, wherein the intersection of a straight line drawn from the axis of the pinion perpendicular to the reciprocating movement of the racks and a line normal to and passing through a point of contact between the acceleration/deceleration tooth of the rack and the acceleration/deceleration tooth of the pinion gradually and smoothly move along the straight line as the pinion rotates.

2. A motion conversion mechanism for converting between rotating motion and reciprocating motion comprising:

a reciprocator including two opposed inner sides and two racks, one rack being disposed on each inner sides;

a guide supporting the reciprocator for reciprocating movement;

a pinion disposed between the racks of the reciprocator, having a circumference and pinion teeth along part of the circumference, the pinion teeth alternatively engaging the respective racks, the pinion rotating about an axis in response to reciprocating movement of the reciprocator;

a deceleration/acceleration cam disposed on the pinion including a cam sliding face facing away from the pinion teeth; and a sliding member disposed on the reciprocator and having a sliding face contacting the cam sliding face when the reciprocator is at a dead point of the reciprocating movement, wherein the intersection of a straight line drawn from the axis of the pinion perpendicular to the reciprocating movement of the racks and a line normal to and passing through a point of contact between the cam sliding face and the sliding face of the sliding member gradually and smoothly moves along the straight line as the pinion rotates.

3. A motion conversion mechanism as claimed in claim 2 wherein:

at least one of the racks has an acceleration/deceleration tooth; and the pinion has an acceleration/deceleration tooth engaging the acceleration/deceleration tooth of the rack, wherein the intersection of a straight line drawn from the axis of the pinion perpendicular to the reciprocating movement of the racks and a line normal to and passing through a point of contact between the acceleration/deceleration tooth of the rack and the acceleration/deceleration tooth of the pinion gradually and smoothly moves along the straight line as the pinion rotates.

4. A motion conversion mechanism for converting between rotating motion and reciprocating motion comprising:

a reciprocator including two opposed inner sides and two racks, one rack being disposed on each of the inner sides;

a guide supporting the reciprocator for reciprocating movement;

a pinion disposed between the racks of the reciprocator having a circumference and pinion teeth disposed along part of the circumference, the pinion teeth alternatively engaging the racks, the pinion rotating about the axis in response to reciprocating movement of the reciprocator;

a bridge extending from one inner side of the reciprocator to the other inner side;

a violence prevention roller disposed on one of the bridge and the pinion; and a violence prevention cam disposed on the other of the bridge and the pinion and having a violence prevention face rolling on the violence prevention roller as the pinion is rotated.

5. A motion conversion mechanism as claimed in claim 4 wherein the violence prevention roller is disposed on the bridge and the violence prevention cam is disposed on the pinion.

6. A motion conversion mechanism as claimed in claim 4 wherein the violence prevention roller is disposed on the pinion and the violence prevention cam is disposed on the bridge.

7. A motion conversion mechanism as claimed in claim 5 including a second violence prevention roller disposed on the bridge, the violence prevention cam contacting one of the violence prevention rollers when the reciprocator is at a first dead point of the reciprocating movement and contacting the other violence prevention roller when the reciprocator is at a second dead point of the reciprocating movement.

8. A motion conversion mechanism for converting between rotating motion and reciprocating motion comprising:

a reciprocator including two opposed inner sides and two racks, one rack being disposed on each of the inner sides;

a guide supporting the reciprocator for reciprocating movement;

a pinion disposed between the racks of the reciprocator having a circumference and pinion teeth along part of the circumference, the pinion teeth alternatively engaging the racks, the pinion rotating about an axis in response to reciprocating movement of the reciprocator; and a staired tooth disposed on the pinion and on at least one of the racks for promoting initiation of meshing between the teeth of the pinion and the teeth of the racks.

9. A motion conversion mechanism for converting between rotating motion and reciprocating motion comprising:

an arcuate reciprocator having two inner sides and two arcuate racks, one arcuate rack being disposed on each of the inner sides;

a guide supporting the reciprocator for reciprocating movement along an arcuate path; and a guide supporting the reciprocator for reciprocating movement along an arcuate path; and a pinion disposed between the racks of the reciprocator having a circumference and pinion teeth along part of the circumference, the pinion teeth alternately engaging the racks, the pinion rotating about an axis in response to reciprocating movement of the reciprocator.

10. A reciprocating internal combustion engine comprising:

a reciprocating piston;
a rotatable shaft; and
a motion conversion mechanism for converting the reciprocation of the piston into rotation of the shaft, the motion conversion mechanism comprising:
a reciprocator including two inner opposed sides and two racks, one rack being disposed on each of the inner sides, at least one of the racks having an acceleration/deceleration tooth;
a guide supporting the reciprocator for reciprocating movement; and
a pinion disposed between the racks of the reciprocator, having a circumference and pinion teeth disposed along part of the circumference, the pinion teeth alternatively engaging the respective racks, the pinion rotating about an axis in response to reciprocating movement of the reciprocator, the pinion having an acceleration/deceleration tooth engaging the acceleration/deceleration tooth of the rack, wherein the intersection of a straight line drawn from the axis of the pinion perpendicular to the reciprocating movement of the racks and a line normal to and passing through a point of contact between the acceleration/deceleration tooth of the rack and the acceleration/deceleration tooth of the pinion gradually and smoothly move along the straight line as the pinion rotates.

11. A reciprocating internal combustion engine comprising:
a reciprocating piston;
a rotatable shaft; and
a motion conversion mechanism for converting the reciprocation of the piston into rotation of the shaft, the motion conversion mechanism comprising:
a reciprocator including two opposed inner sides and two racks, one rack being disposed on each inner sides;
a guide supporting the reciprocator for reciprocating movement;
a pinion disposed between the racks of the reciprocator, having a circumference and pinion teeth along part of the circumference, the pinion teeth alternatively engaging the respective racks, the pinion rotating about an axis in response to reciprocating movement of the reciprocator;
a deceleration/acceleration cam dispose on the pinion including a cam sliding face facing away from the pinion teeth; and
a sliding member disposed on the reciprocator and having a sliding face contacting the cam sliding face when the reciprocator is at a dead point of the reciprocating movement, wherein the intersection of a straight line drawn from the axis of the pinion perpendicular to the reciprocating movement of the racks and a line normal to and passing through a point of contact between the cam sliding face and the sliding face of the sliding member gradually and smoothly moves along the straight line as the pinion rotates.

12. A reciprocating internal combustion engine as claimed in claim 11 wherein:
at least one of the racks has an acceleration/deceleration tooth; and
the pinion has an acceleration/deceleration tooth engaging the acceleration/deceleration tooth of the rack, wherein the intersection of a straight line drawn from the axis of the pinion perpendicular to the reciprocating movement of the racks and a line normal to and passing through a point of contact between the acceleration/deceleration tooth of the rack and the acceleration/deceleration tooth of the pinion gradually and smoothly moves along the straight line as the pinion rotates.

13. A reciprocating internal combustion engine comprising:
a reciprocating piston;
a rotatable shaft; and
a motion conversion mechanism for converting the reciprocation of the piston into rotation of the shaft, the motion conversion mechanism comprising:
a reciprocator including two opposed inner sides and two racks, one rack being disposed on each of the inner sides;
a guide supporting the reciprocator for reciprocating movement;
a pinion disposed between the racks of the reciprocator having a circumference and pinion teeth disposed along part of the circumference, the pinion teeth alternatively engaging the racks, the pinion rotating about the axis in response to reciprocating movement of the reciprocator;
a bridge extending from one inner side of the reciprocator to the other inner side;
a violence prevention roller disposed on one of the bridge and the pinion; and
a violence prevention cam disposed on the other of the bridge and the pinion and having a violence prevention face rolling on the violence prevention roller as the pinion is rotated.

14. A reciprocating internal combustion engine comprising:
a reciprocating piston;
a rotatable shaft; and
a motion conversion mechanism for converting the reciprocation of the piston into rotation of the shaft, the motion conversion mechanism comprising:
a reciprocator including two opposed inner sides and two racks, one rack being disposed on each of the inner sides;
a guide supporting the reciprocator for reciprocating movement;
a pinion disposed between the racks of the reciprocator having a circumference and pinion teeth along part of the circumference, the pinion teeth alternatively engaging the racks, the pinion rotating about an axis in response to reciprocating movement of the reciprocator; and
a staired tooth disposed on the pinion and on at least one of the racks for promoting initiation of meshing between the teeth of the pinion and the teeth of the racks.

15. A reciprocating internal combustion engine comprising:
a casing having a plurality of working chambers;
a piston base wheel disposed in the casing and having a plurality of pistons projecting therefrom, each of the pistons extending into one of the working chambers;
a recess formed in the casing and having an inner surface;
a reciprocator including two opposed inner sides and two racks, one rack being disposed on each of the inner sides, the reciprocator being supported by the inner surface of the recess for reciprocating movement; and a pinion disposed between the racks of the reciprocator having a circumference and pinion teeth along part of the circumference, the pinion teeth alternatively engaging the respective racks, the pinion rotating about an axis in response to reciprocating movement of the reciprocator.

* * * * *